Nov. 1, 1949         A. R. SNYDER         2,486,765
ROCK SAW
Filed Dec. 20, 1946

Inventor
Antone Rex Snyder

By *Clarence A. O'Brien
and Harvey B. Jacobson*
Attorneys

Patented Nov. 1, 1949

2,486,765

UNITED STATES PATENT OFFICE 2,486,765

ROCK SAW

Antone Rex Snyder, Morton, Wyo.

Application December 20, 1946, Serial No. 717,547

4 Claims. (Cl. 125—13)

This invention relates to improvements in rock saws.

An object of the invention is to provide an improved rock saw which will be operated by any desired power device, and will include a hydraulic feed mechanism for feeding the rock supporting clamping jaws to the rotary saw.

Another object of the invention is to provide an improved rock saw having a power driven rotary saw blade and an adjustable rock supporting clamp mounted for slidable adjustment toward and away from the rotary saw blade, the same being operated by a hydraulic cylinder and piston suitably connected with said rock supporting clamp.

A futher object of the invention is to provide an improved rock saw having a power driven rotary saw blade and a hydraulically operated adjustable rock clamp mounted for movement toward and away from the saw blade, together with a fluid pump and oil reservoir or tank connected therewith to provide the oil under pressure for operating the feeding of the rock clamp toward the rotary rock saw blade.

Another object of the invention is to provide an improved power operated rock saw with a an hydraulic fed rock clamp, the same being highly efficient in operation and relatively inexpensive to manufacture and produce.

Other objects will appear as the description proceeds.

Figure 1:
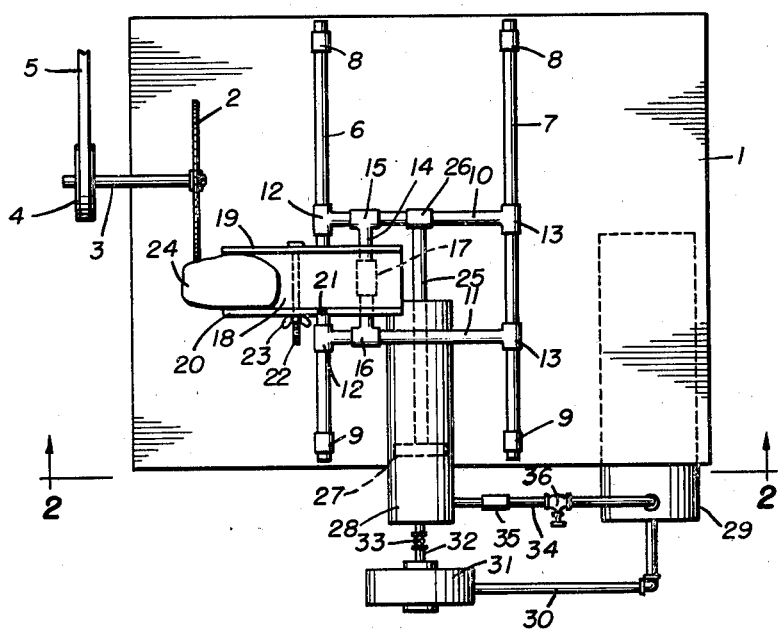
Figure 2:
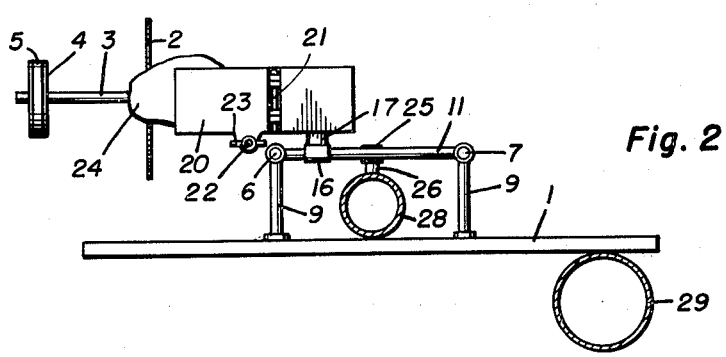

In the accompanying drawings which form a part of this application,

Figure 1 is a plan view of the improved rock saw forming the subject matter of the instant invention, and Figure 2 is a sectional view taken on the line 2—2 of Figure 1.

Like characters of references are used throughout the following specification and the accompanying drawings to designate corresponding parts.

In carrying out the invention, there is provided an improved form of rock saw including a base 1 which will be suitably supported upon the ground or in elevated position by any desired means (not shown).

A rotary saw blade 2 will be mounted upon a shaft 3 upon which a pulley 4 is secured for receiving the driving belt 5 from any source of power supply (not shown).

A guide frame is mounted above the upper surface of the base 1 in spaced relation thereto and comprises the parallel spaced tubes 6 and 7 supported at their opposite ends by the vertical supporting legs or members 8 and 9, to extend in parallel relation with the rotary saw blade 2 and at one side thereof.

A feed frame is slidably disposed upon the pipes or tubes 6 and 7 and comprises the parallel spaced tubes or frame members 10 and 11 having hollow T fittings 12 and 13 on their opposite ends slidably supported on said pipes or tubes 6 and 7 and a connecting tube or member 14 having hollow T-fittings 15 and 16 on its opposite ends is secured in fixed position upon the said tubes or frame member 10 and 11.

An improved form of rock clamp is secured to the connection tube or member 14 by means of the bracket or clamp member 17, and includes a laterally extending rock supporting bottom portion 18 and a fixed or integral upwardly extending side rock clamping jaw 19.

An adjustable rock clamping jaw 20 is pivotally hinged to and supported by the bottom portion 18 of the rock clamp upon a vertical pivot pin or rod 21 supported by said bottom portion 18 of the rock clamp, said jaws cooperating with an elongated threaded bolt 22 which extends through the fixed clamping jaw 19 and through the adjustable pivoted jaw 20, to support the wing nut 23 on its outer end for tightening upon the bolt 22 to firmly clamp a rock 24 between said rock clamping jaws.

The hydraulic feed mechanism feeding the rock clamping jaws and rock 24 toward the rotary saw blade 2 includes a piston rod 25 connected at its outer end by means of the T-fitting 26 to the tube or frame member 10 of the feed frame, the opposite end of said piston rod 25 supporting a piston 27 slidably received in the fixed feed cylinder 28 suitably supported upon the base 1.

An oil reservoir or tank 29 is supported either above or below the base 1, and is connected by means of the pipe 30 with the hydraulic pump 31 which may be operated by any desired power supply (not shown). A pipe 32 leads the oil under pressure from the pump 31 to the end of the hydraulic cylinder 28 to operate the piston 27 for feeding the rock 24 to the rotary saw blade 2, and is controlled by a needle type valve 33 connected with said pipe 32.

An oil release or escape pipe 34 extends between the inner end of the cylinder 28 and the oil reservoir or tank 29, and is controlled by the needle type valve 36 for returning the oil to said reservoir or tank 29 as the rock clamping jaws are retracted away from the rotary saw blade 2 after each operation or cut is made.

From the foregoing description, it will be apparent that there has been devised and provided a highly efficient form of rock saw which will be provided with a hydraulic feed means for feeding rocks to the rotary saw blade, said saw being relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A rock saw comprising a base, a rotary power driven saw blade supported thereon, a pair of opposed frame members supported on said base and extending parallel with said saw blade, a pair of transverse tubes transversely disposed between said frame members and slidably received at their opposite ends on said frame members, a connecting member between said tubes, an adjustable rock supporting clamp supported on said connecting member and extending outwardly from between the tubes, hydraulic means for moving said tubes and clamp towards the cutting edge of said saw blade.

2. A rock saw comprising a base, a rotary power driven saw blade supported thereon, a pair of opposed frame members supported on said base and extending parallel with said saw blade, a pair of transverse tubes transversely disposed between said frame members transverse sleeves disposed at the ends of the tubes and slidably received on the frame members, a connecting member between said tubes, and adjustable rock supporting clamp supported on said connecting member and extending outwardly from between the tubes, hydraulic means for moving said clamp towards the cutting edge of said saw blade, said hydraulic means including a piston rod secured at one end to one of the transverse tubes, a piston supported on the other end, said piston slidably received in a cylinder supported on the base, means for actuating said piston in said cylinder.

3. Combination of claim 2, said means including an oil reservoir connected with said cylinder and a hydraulic pump connected between said cylinder and said oil reservoir, a control valve between the cylinder and the hydraulic pump and between said cylinder and said oil reservoir.

4. A rock saw comprising a base, a rotary power driven saw blade supported thereon, a pair of opposed frame members supported on said base and extending parallel with said saw blade, a pair of transverse tubes slidably connected between said frame members, an adjustable rock supporting clamp supported on said tubes and extending outwardly therefrom, hydraulic means for moving said clamp towards the cutting edge of said saw blade, said clamp including a laterally extending bottom portion adjustably secured to said transverse tubes, an upwardly extending side jaw integrally formed therewith, an adjustable clamping jaw pivoted to said bottom portion and means to secure said clamping jaw in cooperation with the opposed side jaw so as to securely hold a rock therebetween.

ANTONE REX SNYDER.

REFERENCES CITED

The following references are of record in the file of this patent:

UNITED STATES PATENTS

| Number | Name | Date |
|---|---|---|
| 1,533,056 | Yager et al. | Apr. 7, 1925 |
| 2,254,046 | Pearson | Aug. 26, 1941 |
| 2,371,085 | Waters | Mar. 6, 1945 |
| 2,420,790 | Moeller | May 20, 1947 |
| 2,421,349 | Moeller | May 27, 1947 |
| 2,431,469 | Eyles | Nov. 25, 1947 |